H. A. HUTSON.
Cigar Pipe.

No. 240,134.                    Patented April 12, 1881.

Witnesses:
B. Clark White.
Demick

Inventor:
Henry A. Hutson

UNITED STATES PATENT OFFICE.

HENRY A. HUTSON, OF CHICAGO, ILLINOIS.

CIGAR-PIPE.

SPECIFICATION forming part of Letters Patent No. 240,134, dated April 12, 1881.

Application filed November 7, 1879.

*To all whom it may concern:*

Be it known that I, HENRY A. HUTSON, of Chicago, county of Cook, and State of Illinois, have invented a Cigar-Pipe or Pipe-Cigar; and I do hereby declare that the following is a full and exact description thereof, reference being had to the accompanying drawings, and to the letters of reference marked thereon.

Figure 1:
Figure 2:
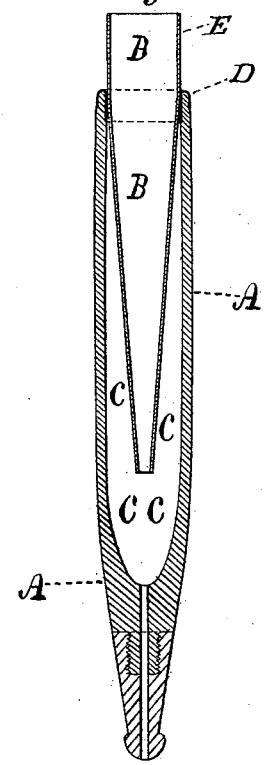

Figure 1 represents a side view of my cigar-pipe, and Fig. 2 is a central longitudinal section thereof.

This invention has relation to cigar-pipes or pipe-cigars; and it consists in the construction and novel arrangement within an elongated outer shell, having a mouth-piece at one end and a ring-bearing at its front end, of a conically wedge-shaped tobacco-holder inserted by its smaller end within said shell to bear against its ring, and projecting somewhat beyond said ring, as hereinafter shown and described.

In the annexed drawings, the letter A designates the outer shell, made with an elongated cylindrical chamber, and having around its open front end a bearing-ring, D, and at the other end a mouth-piece of usual form and construction.

B indicates the tobacco-holder, covered with some non-conducting material and made in conical form. This tobacco-holder is introduced by its smaller end within the chamber of the shell, and extends within it, so that its end is near the duct of the mouth-piece, but its bearing is only within the ring D at the outer end of the shell, and as it does not touch the shell within the chamber, a free space, C, is provided at its smaller end and around it within the shell for the circulation of the smoke before it reaches the mouth-duct. Its front end, E, projects from the shell, as shown, and serves as a means for tightening the holder in the bearing-ring by turning it around and pressing on it, so as to secure a tight joint, without which it could not operate. It also serves for readily removing the tobacco-holder for cleaning purposes. As the only bearing is in the ring D, the case of the tobacco-holder can only communicate its heat by contact at this point, which is farthest from the mouth, and the heat has time to escape from the shell before reaching the lips.

I am aware that a tobacco-holder arranged within a shell and having an air-space around it is not broadly new, and I do not claim it.

What I claim, and desire to secure by Letters Patent, is—

A cigar-pipe having an elongated chamber and a bearing-ring, D, at its outer end, and a conically wedge-shaped tobacco-holder, B, the conical part of which is seated in said ring and projecting by its narrower and longer portion within said chamber, leaving a free air-space, C, between its walls and that of the shell, and projecting by its larger end E in front of said ring for adjusting the holder to form a tight joint, as specified.

HENRY A. HUTSON.

Witnesses:
FRANK N. COLLINS,
D. L. ZOOK.